United States Patent
Baba

(10) Patent No.: US 7,826,008 B2
(45) Date of Patent: Nov. 2, 2010

(54) LIQUID CRYSTAL DISPLAY DEVICE HAVING DIRECT BACKLIGHT WITH AN ODD NUMBER OF FLUORESCENT LAMPS PROVIDING ENHANCED BRIGHTNESS AT CENTER OF SCREEN

(75) Inventor: Masashi Baba, Chiba (JP)

(73) Assignee: Hitachi Displays, Ltd., Chiba (JP)

( * ) Notice: Subject to any disclaimer, the term of this patent is extended or adjusted under 35 U.S.C. 154(b) by 251 days.

(21) Appl. No.: 12/028,118

(22) Filed: Feb. 8, 2008

(65) Prior Publication Data
US 2008/0192180 A1 Aug. 14, 2008

(30) Foreign Application Priority Data
Feb. 8, 2007 (JP) ............... 2007-029182

(51) Int. Cl.
*G02F 1/1333* (2006.01)
*G02F 1/1335* (2006.01)
*G09F 13/08* (2006.01)

(52) U.S. Cl. .................. 349/70; 349/58; 349/61; 362/97.1; 362/97.2; 362/224; 362/225

(58) Field of Classification Search .......... 349/58, 349/61, 70, 224, 225, 97.1, 97.2
See application file for complete search history.

(56) References Cited

U.S. PATENT DOCUMENTS 7,648,250 B2 * 1/2010 Lee ................. 362/97.2
2005/0063170 A1 * 3/2005 Lee et al. ................ 362/31
2005/0243551 A1 * 11/2005 Onishi et al. ............ 362/244
2006/0002107 A1 * 1/2006 Jeong ................. 362/225
2006/0158905 A1 * 7/2006 Lai et al. ................ 362/634
2007/0013825 A1 * 1/2007 Kim et al. ............... 349/58
2007/0076142 A1 * 4/2007 Ohshima et al. .......... 349/70
2007/0127226 A1 * 6/2007 Chen et al. .............. 362/29

FOREIGN PATENT DOCUMENTS

| JP | 2001-210126 | 8/2001 |
| JP | 2004-318176 | 11/2004 |
| JP | 2006-114445 | 4/2006 |

* cited by examiner

*Primary Examiner*—Michael H Caley
(74) *Attorney, Agent, or Firm*—Antonelli, Terry, Stout & Kraus, LLP.

(57) ABSTRACT

The present inventions enhances the brightness at a center portion of a display screen in a liquid crystal display device used in a TV set having a direct backlight. Odd-number pieces of fluorescent lamps are used in the inside of the backlight. Using external electrode fluorescent lamps as the fluorescent lamps, electrodes of the respective fluorescent lamps can be connected in common. Further, one fluorescent lamp can be arranged at the center of the display screen. Due to such a constitution, the liquid crystal display device can effectively ensure the brightness at the center of the display screen.

8 Claims, 7 Drawing Sheets

LIQUID CRYSTAL DISPLAY DEVICE HAVING DIRECT BACKLIGHT WITH AN ODD NUMBER OF FLUORESCENT LAMPS PROVIDING ENHANCED BRIGHTNESS AT CENTER OF SCREEN

CROSS-REFERENCE TO RELATED APPLICATIONS

The disclosure of Japanese Patent Application No. P2007-029182 filed on Feb. 8, 2002 (yyyy/mm/dd) including the claims, the specification, the drawings and the abstract is incorporated herein by reference in its entirety.

BACKGROUND OF THE INVENTION

1. Field of the Invention

The present invention relates to a liquid crystal display device, and more particularly to a direct backlight and a liquid crystal display deice which uses the direct backlight.

2. Description of the Related Art

A liquid crystal display device has been spreading to a field of a large-sized display device such as a television receiver set (hereinafter, referred to as TV). The liquid crystal display device comprises a panel and a backlight. A type of the backlight are classified as "front light", "direct backlight" or "side (edge) light". The light source(s) is arranged over a front surface of the display panel in the case of "front light". The light source(s) is arranged below the display panel and not overlapped by a display area of the display device, in the case of "direct backlight". The light source(s) is arranged under the display panel and not overlapped by the display area, in the case of "direct backlight"

The large-sized display device often uses a direct backlight for acquiring sufficient brightness. As a light source of the backlight, fluorescent lamps have been mainly used. To cope with a large-sized screen, the fluorescent lamps are elongated. Further, a light emitting efficiency is increased corresponding to the decrease of a diameter of the fluorescent lamps. Accordingly, in the large-screen liquid crystal display device, a large number of fine elongated fluorescent lamps are used.

Since the fine elongated fluorescent lamps are mechanically unstable, an intermediate holder is used in an intermediate position between terminal portions for supporting the fluorescent lamp. Patent document 1 (JP-A-2001-210126) discloses a technique for forming the intermediate holder using a transparent member which forms a cut-out circular holding portion having an opening portion in a portion thereof and possesses flexibility. On the other hand, there may be a case that the intermediate holder influences emission of light from the fluorescent lamp thus giving rise to brightness irregularities of the backlight. Patent document 2 (JP-A-2004-318176) discloses a technique for reducing the influence of the intermediate holder on the brightness irregularities of the backlight. Further, patent document 3 (JP-A-2006-114445) discloses a technique for facilitating the manufacture of direct backlights by modifying the direct backlight structure. Still further, patent document 4 (JP-A-2004-318176) discloses a technique for using light emitting diodes to the backlight in addition to fluorescent lamps for adjusting a color tone of a backlight using fluorescent lamps.

SUMMARY

In a computer-monitor-use display which has used a liquid crystal display device conventionally, a screen is required to exhibit uniform brightness. However, a viewer watches the computer-monitor-use display arranged at a position close to the viewer and hence, the brightness of the screen is not so necessary. On the other hand, with respect to a TV using a liquid crystal display device whose demand is increasing, a viewer watches a screen arranged at a position relatively remote from the viewer and hence, the brightness of the screen is important.

To ensure the brightness of the screen, it is necessary to increase the brightness of the backlight. Accordingly, it is necessary to increase the number of fluorescent lamps. For example, a 37-inch screen uses 20 pieces of fluorescent lamps, and a 32-inch screen uses 18 pieces of fluorescent lamps. The increase of the number of fluorescent lamps leads to the increase of the power consumption of the backlight thus eventually increasing the power consumption of the TV.

While the TV is required to exhibit the sufficient brightness of the screen, the necessity of uniformity of brightness of the screen is not so high compared to the computer monitor or the like. The TV is required to exhibit rather high brightness at the center of the screen. This implies that the power consumption of the backlight can be saved by slightly decreasing the brightness at a periphery of the screen while increasing the brightness at the center of the screen.

FIG. 15 shows an arrangement example of fluorescent lamps 37 of a conventional backlight. In FIG. 15, 16 pieces of fluorescent lamps 37 are used. The fluorescent lamps 37 are supported in pairs respectively by intermediate holders 40. That is, each pair of the fluorescent lamps 37 is supported by one intermediate holder 40. Cold cathode fluorescent lamps (CCFL) are used as the fluorescent lamps 37. Further, a power source is provided for every pair of fluorescent lamps 37. Conventionally, the number of fluorescent lamps 37 is even number. That is, the fluorescent lamps 37 are used in pairs. This is because that in view of a fact that the fluorescent lamps 37 used for the backlight are driven with high frequency using an inverter for preventing flickering of brightness, the arrangement of fluorescent lamps 37 in pairs is convenient to supply electricity to the fluorescent lamps 37 from the inverter.

Recently, there has been known a type of liquid crystal display device which uses, as the fluorescent lamps, external electrode fluorescent lamps (EEFL) discharging and emitting light by forming electrodes on outer sides thereof instead of the cold cathode fluorescent lamps (CCFL). This type of liquid crystal display device is shown in FIG. 16. As shown in FIG. 16, the use of the external electrode fluorescent lamps (EEFL) requires no connection of cables with the respective fluorescent lamps 37 and electricity can be collectively supplied to all fluorescent lamps 37. Even when such external electrode fluorescent lamps (EEFL) are used, however, the even-number pieces of fluorescent lamps are used conventionally in the same manner as the usual fluorescent lamps. In FIG. 16, numeral 371 indicates a fluorescent-lamp common electrode, and numeral 372 indicates a fluorescent-lamp-use cable.

With the backlight having the above-mentioned conventional constitution, the reduction of power consumption of the backlight in a liquid crystal TV is limited.

Based on the finding that the brightness at the center of the screen is important and the brightness at the periphery of the screen is not so important with respect to the TV screen, it is an object of the present invention to provide a display device which can ensure the brightness at the center of the TV screen by setting the number of the fluorescent lamps of the backlight for the TV to odd-number thus enabling the arrangement of the fluorescent lamp at the center of the screen. To explain specific means for achieving the above-mentioned object, they are as follows.

(1) According to a first aspect of the present invention, there is provided a liquid crystal display device which includes a liquid crystal display panel, and a direct backlight including a plurality of fluorescent lamps, wherein the fluorescent lamps are external electrode fluorescent lamps, the number of fluorescent lamps is odd-number, and the fluorescent lamp positioned at the center of the plurality of fluorescent lamps is aligned with the center of a screen of the liquid crystal display panel.

(2) In the liquid crystal display device described in (1), intervals of the plurality of fluorescent lamps are set to a fixed value.

(3) In the liquid crystal display device described in (1), the intervals of the fluorescent lamps between the fluorescent lamp arranged at the center of the screen and the fluorescent lamps arranged on both sides of the fluorescent lamp at the center of the screen are set smaller than intervals of other fluorescent lamps arranged at peripheries of the screen.

(4) In the liquid crystal display device described in (1), the intervals of the fluorescent lamps between the fluorescent lamp arranged at the center of the screen and the fluorescent lamps arranged on both sides of the fluorescent lamp at the center of the screen are set different from intervals of other fluorescent lamps arranged at peripheries of the screen, and the intervals of other fluorescent lamps are set to a fixed value.

(5) According to a second aspect of the present invention, there is provided a TV-use liquid crystal display device which includes: a liquid crystal display panel; and a direct backlight including a plurality of fluorescent lamps, a light guide plate, a diffusion sheet and a reflection sheet arranged below the plurality of fluorescent lamps, wherein the fluorescent lamps are external electrode fluorescent lamps, the number of fluorescent lamps is odd-number, and the fluorescent lamp positioned at the center of the plurality of fluorescent lamps is aligned with the center of a screen of the liquid crystal display panel.

(6) According to a third aspect of the present invention, there is provided a liquid crystal display device which includes: a liquid crystal display panel; and a direct backlight including a plurality of fluorescent lamps, wherein the fluorescent lamps are external electrode fluorescent lamps, the number of fluorescent lamps is odd-number, the fluorescent lamp positioned at the center of the plurality of fluorescent lamps is aligned with the center of a screen of the liquid crystal display panel, and the fluorescent lamp is supported by an intermediate holder between external electrodes.

(7) In the liquid crystal display device described in (6), the intermediate holder supports one fluorescent lamp arranged at the center of the screen and other intermediate holders respectively support 2 pieces of fluorescent lamps.

(8) In the liquid crystal display device described in (6), all fluorescent lamps are supported on the same intermediate holder.

(9) In the liquid crystal display device described in (6), the fluorescent lamp arranged at the center of the screen out of the plurality of fluorescent lamps is supported on a plurality of intermediate holders.

(10) In the liquid crystal display device described in (6), the intermediate holder supports one fluorescent lamp arranged at the center of the screen, other intermediate holders respectively support 2 pieces of fluorescent lamps, and the intermediate holders which respectively support 2 pieces of fluorescent lamps are formed of the same part.

(11) According to a fourth aspect of the present invention, there is provided a TV-use liquid crystal display device which includes a liquid crystal display panel; and a direct backlight including a plurality of fluorescent lamps, a light guide plate, a diffusion sheet and a reflection sheet arranged below the plurality of fluorescent lamps, wherein the fluorescent lamps are external electrode fluorescent lamps, the number of fluorescent lamps is odd-number, the fluorescent lamp positioned at the center of the plurality of fluorescent lamps is aligned with the center of a screen of the liquid crystal display panel, and the fluorescent lamp is supported by an intermediate holder between external electrodes.

Due to the above-mentioned liquid crystal display devices, it is possible to provide a liquid crystal TV which exhibits low power consumption without lowering the brightness in appearance. Advantageous effects of the respective means are as follows.

According to the liquid crystal display device described in (1), the plurality of fluorescent lamps is provided and the fluorescent lamp is arranged at the center of the screen of the liquid crystal display panel and hence, it is possible to effectively increase the brightness at the center of the screen. Further, since the external electrode fluorescent lamps are used as the fluorescent lamps, the odd-number arrangement of the fluorescent lamps can be easily realized.

According to the liquid crystal display device described in (2), the intervals of the plurality of fluorescent lamps are set to a fixed value and hence, the backlight can be easily assembled. Further, in holding the fluorescent lamps using the intermediate holders, the same intermediate holder can be used.

According to the liquid crystal display device described in (3), out of the plurality of fluorescent lamps, the intervals of the fluorescent lamps between the fluorescent lamp arranged at the center of the screen and the fluorescent lamps arranged on both sides of the fluorescent lamp at the center of the screen are set smaller than intervals of other fluorescent lamps. Accordingly, the brightness at the center of the screen can be more effectively increased.

According to the liquid crystal display device described in (4), the brightness at the center of the screen can be more effectively increased and, at the same time, in using the intermediate holders, the same intermediate holder can be used and hence, the increase of a part cost of the intermediate holders can be suppressed.

According to the TV-use liquid crystal display device described in (5) which uses the direct backlight, the odd-number pieces of fluorescent lamps are used, and the fluorescent lamp is arranged at the center of the screen and hence, the brightness at the center of the screen can be more effectively increased. Accordingly, it is possible to ensure the brightness of the screen in appearance thus suppressing the power consumption of the backlight correspondingly.

According to the TV-use liquid crystal display device described in (6), the plurality of fluorescent lamps are provided and the fluorescent lamp is arranged at the center of the screen of the liquid crystal display panel and hence, it is possible to effectively increase the brightness at the center of the screen. Further, since the external electrode fluorescent lamps are used as the fluorescent lamps, the odd-number arrangement of the fluorescent lamps can be easily realized. Further, the fluorescent lamps can be supported on the intermediate holders and hence, the mechanical stability of the fluorescent lamps and the backlight can be increased.

According to the TV-use liquid crystal display device described in (7), the intermediate holder supports one fluorescent lamp arranged at the center of the screen and other intermediate holders respectively support 2 pieces of fluorescent lamps and hence, the constitution of the backlight becomes simple, the fluorescent lamps can be fixed in a stable manner, and the brightness at the center of the screen can be effectively increased.

According to the TV-use liquid crystal display device described in (8), all fluorescent lamps are supported on the same intermediate holder and hence, the backlight can be easily assembled and a part cost of the intermediate holders can be reduced.

According to the TV-use liquid crystal display device described in (9), the fluorescent lamp arranged at the center of the screen is supported on a plurality of intermediate holders and hence, the same intermediate holder can be used thus enhancing the brightness at the center of the screen.

According to the TV-use liquid crystal display device described in (10), the intermediate holder supports one fluorescent lamp arranged at the center of the screen, other intermediate holders respectively support 2 pieces of fluorescent lamps, and the intermediate holders which respectively support 2 pieces of fluorescent lamps are formed of the same part. Due to such a constitution, the constitution of the backlight becomes simple, the fluorescent lamps can be fixed in a stable manner, and the increase of a part cost of the intermediate holders can be suppressed.

According to the TV-use liquid crystal display device described in (11), in a TV-use liquid crystal display device which uses a direct backlight, the odd-number pieces of fluorescent lamps are used, and the fluorescent lamp is positioned at the center of the screen and hence, it is possible to effectively enhance the brightness at the center of the screen. Accordingly, the brightness in appearance of a screen can be ensured and hence, the power consumption of the backlight can be suppressed correspondingly. Further, the fluorescent lamps are supported on the intermediate holders and hence, it is possible to support the fluorescent lamps in a stable manner and, at the same time, it is possible to increase the mechanical stability of the TV-use liquid crystal display device.

DESCRIPTION OF THE PREFERRED EMBODIMENTS

In accordance with embodiments, detailed contents of the present invention are described.

Embodiment 1

Figure 1:
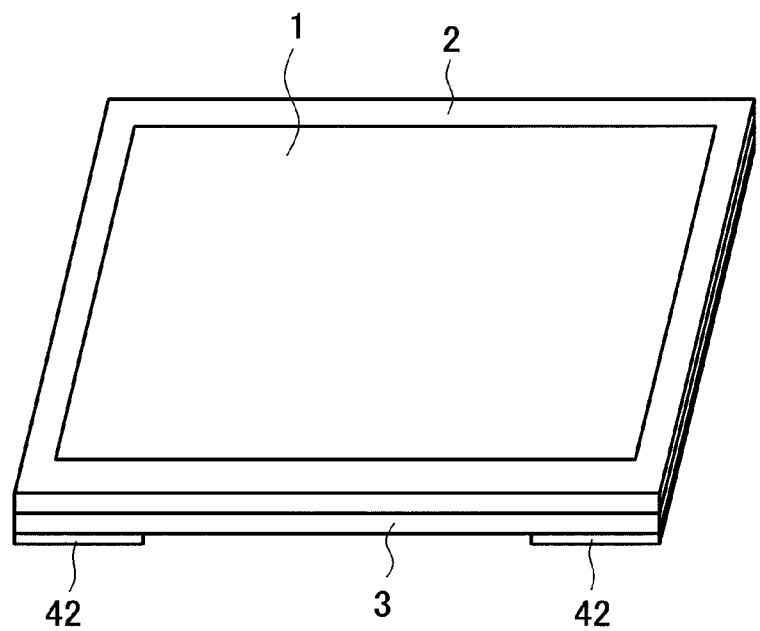
FIG. 1 is a schematic view of a liquid crystal display device according to an embodiment 1 of the present invention.

FIG. 1 is a schematic view of a liquid crystal display device. A liquid crystal display panel 1 is stored in the inside of a frame-shaped surface frame 2. The liquid crystal display panel 1 is constituted of a TFT substrate on which image signal lines, scanning lines, pixel electrodes, thin film transistors (TFT) and the like are formed, a counter substrate on which a color filter substrate and the like are formed, a lower polarizer adhered to the TFT substrate, and an upper polarizer adhered to the counter substrate. The liquid crystal display panel 1 is covered with a surface frame 2. In FIG. 1, only a display screen of the liquid crystal display panel 1 is shown.

A backlight 3 is arranged behind the liquid crystal display panel 1. The liquid crystal display panel 1 changes over light from the backlight 3 for every pixel to form an image. For efficiently taking out the light toward the liquid crystal display panel 1, the backlight 3 is constituted of a light source such as fluorescent lamps and various kinds of optical parts. A fluorescent lamp 37 which constitutes a light source of the backlight 3 is driven at a high frequency using an inverter for preventing the generation of flickers. The inverter is stored in an inverter box 42 shown in FIG. 1.

Figure 2:
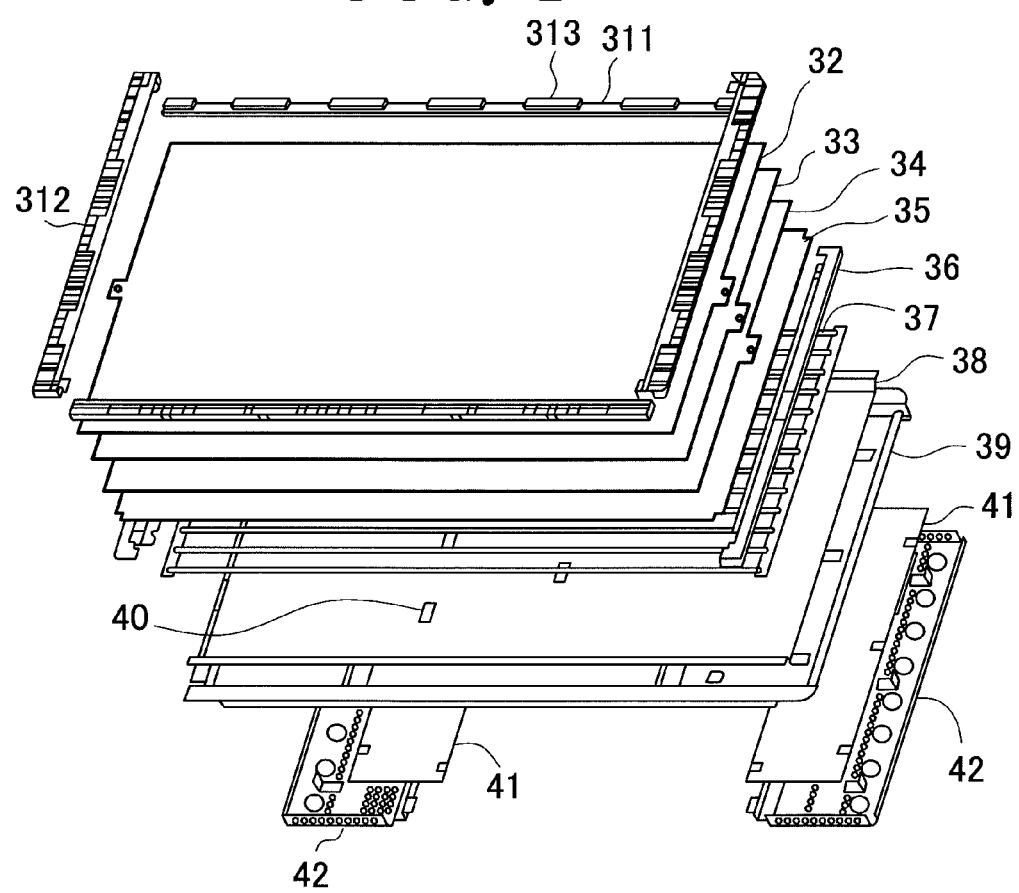
FIG. 2 is an exploded perspective view of a backlight of the liquid crystal display device.

FIG. 2 is an exploded perspective view of a backlight portion. The backlight 3 is a backlight 3 for a large-sized display device such as a TV, and is a so-called direct backlight. A mold frame on which the liquid crystal display panel is mounted is constituted of a long-side mold frame 311 and a short-side mold frame 312. This is because that a material yield rate can be increased.

The liquid crystal display panel 1 is mounted on the mold frame. On a periphery of the liquid crystal display panel 1 not shown in the drawing, an IC driver for driving the liquid crystal display panel 1 and a flexible printed circuit board which supplies image signals and a power source to the liquid crystal display panel 1 and the IC driver are mounted. The flexible printed circuit board is folded back to a back portion of the liquid crystal display device for reducing a profile of the liquid crystal display device. A flexible printed circuit board receiving plate 313 formed on the mold frame is provided for receiving the flexible printed circuit board.

In the inside of the mold frame, three diffusion sheets 32, 33, 34 are arranged to face a back surface of the liquid crystal display panel 1 in an opposed manner. The diffusion sheets 32, 33, 34 play a role of diffusing light from the light source and of emitting light to the liquid crystal display panel 1 uniformly. Surfaces of the diffusion sheets 32, 33, 34 are respectively made uneven in general for acquiring a light focusing effect. For enhancing the light focusing effect, 3 pieces of diffusion sheets are used instead of 1 piece of diffusion plate. A diffusion sheet having a thickness of approximately 0.2 mm is used.

A diffusion plate 35 is arranged below the diffusion sheet 34. The diffusion plate 35 plays a role of making light from the fluorescent lamp 37 which constitutes the light source uniform and of directing the light to the liquid crystal display panel 1. A thickness of the diffusion plate 35 is set to 1 mm. The diffusion plate 35 is mounted on a side mold frame 36.

A plurality of fluorescent lamps 37 which constitutes the light source is arranged below the side mold frame 36. The brightness of the screen is directly influenced by a quantity of light radiated from the light source 37. In this embodiment, different from a conventional display device which uses even-number pieces of fluorescent lamps, odd-number pieces of, that is, 13 pieces of fluorescent lamps 37 are used. The fluorescent lamps 37 are mounted on the lower frame 39. On the other hand, for directing the light from the fluorescent lamps 37 to the liquid crystal display panel 1 side as much as possible, a reflection sheet 38 is arranged between the lower frame 39 and the fluorescent lamps 37.

When a size of a screen becomes large, a length of the fluorescent lamps 37 is increased. On the other hand, the smaller a tube diameter of the fluorescent lamps 37, the higher a light emitting efficiency of the fluorescent lamps 37 becomes and hence, the fluorescent lamps 37 used as a backlight of a liquid crystal display device are formed of an elongated fine tube. For preventing the fluorescent lamps 37 from being moved or damaged attributed to vibrations or the like, intermediate holders 40 made of a resin are provided. The intermediate holders 40 are mounted on the lower frame 39 by way of the reflection sheet 38.

The fluorescent lamps 37 are driven by an inverter. The inverter is mounted on an inverter substrate 41 which is arranged on a back side of the lower frame 39. The inverter is protected by an inverter cover 42. The fluorescent lamps 37 used in this embodiment are, different from conventional cold cathode fluorescent lamps CCFL to which a power source is supplied via cables and which respectively include the electrodes therein, external electrode fluorescent lamps EEFL which respectively mount an electrode for discharging on outer portions thereof.

The conventional CCFL have been used in pairs for eliminating brightness irregularities among the respective lamps or for reducing the number of cables or the like for connecting the power source with the lamps. Accordingly, assuming the number of the fluorescent lamp 37 used in the backlight of the liquid crystal display device as "n", n/2 pieces of inverter power sources become necessary. To the contrary, the external electrode fluorescent lamps can connect the electrodes thereof with the power source outside the fluorescent lamps and hence, it is possible to obtain an advantageous effect that all fluorescent lamps 37 can be driven via a single line from the power source.

Figure 3:
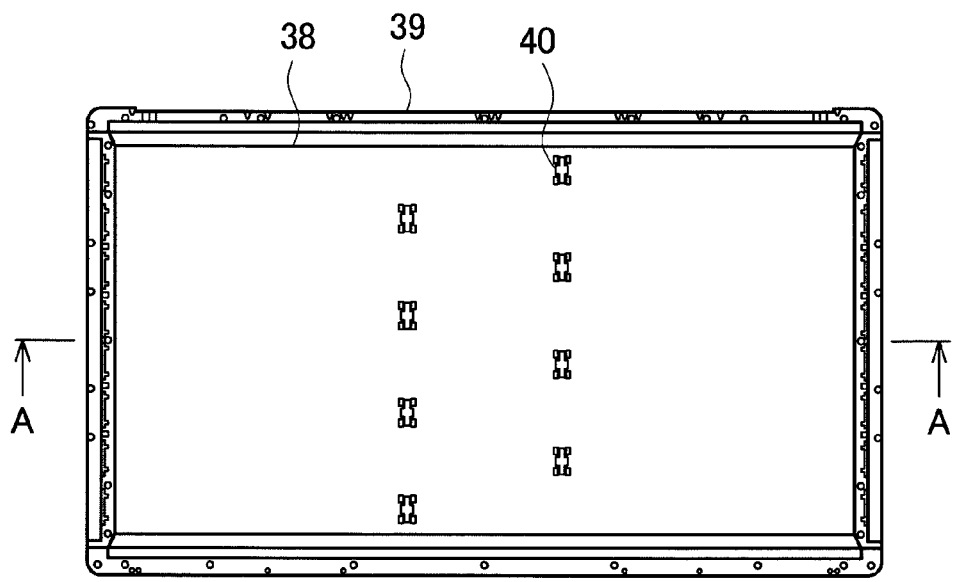
FIG. 3 is a plan view of a lower frame in which the fluorescent lamps are accommodated.

FIG. 3 is a plan view showing a state that the reflection sheet 38, the intermediate holders 40 and a 1-piece-use intermediate holder 50 are mounted on the lower frame 39. Here, the intermediate holder 40 is a holder for supporting 2 pieces of fluorescent lamps, and the intermediate holder 50 is a holder for supporting one fluorescent lamp. In FIG. 3, three intermediate holders 40 each of which supports 2 pieces of fluorescent lamps are arranged on an upper side of the lower frame 39, and three intermediate holders 40 each of which supports 2 pieces of fluorescent lamps are arranged on a lower side of the lower frame 39. Further, the 1-piece-use intermediate holder 50 which supports one fluorescent lamp is arranged at the center of the lower frame 39.

Figure 4:
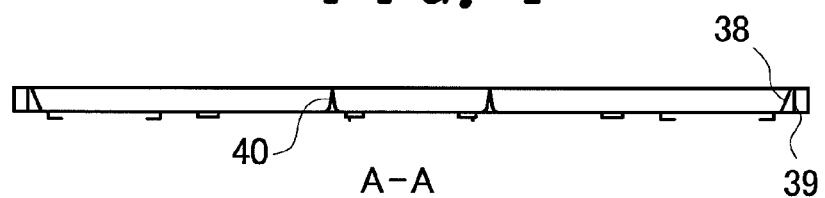
FIG. 4 is a cross-sectional view taken along a line A-A in FIG. 3.

FIG. 4 is a cross-sectional view taken along a line A-A in FIG. 3. The reflection sheet 38 is arranged on the inside of the lower frame 39 in a trough shape. The intermediate holders 40 are arranged in two rows in a staggered manner. In FIG. 4, the intermediate holders 40 each of which supports 2 pieces of fluorescent lamps are shown. Portions projecting from distal ends of the intermediate holders 40 play a role of spacers for defining a distance between the diffusion plate 35 and the fluorescent lamps as described later.

Figure 5:
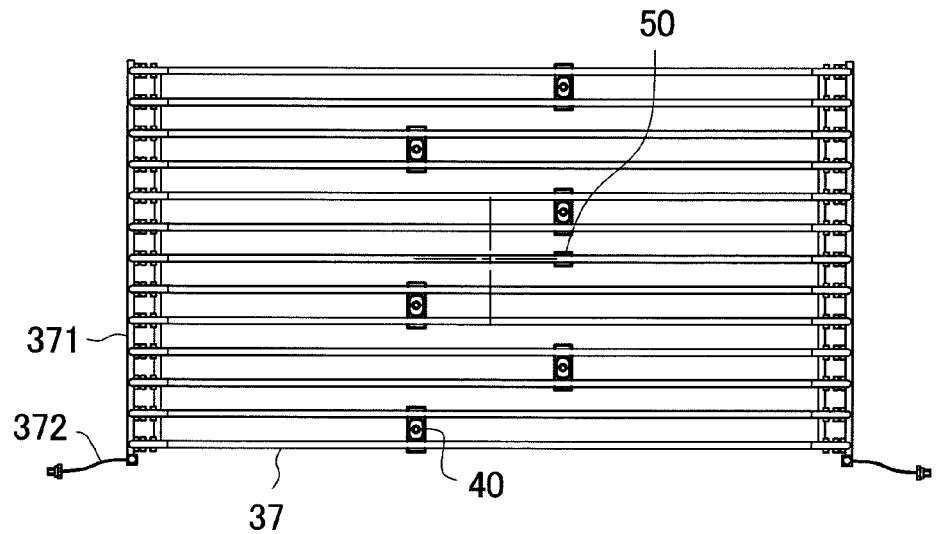
FIG. 5 is an arrangement view of fluorescent lamps of the liquid crystal display device of the embodiment 1.

FIG. 5 shows a state in which only the fluorescent lamps 37 in FIG. 2 is picked up. In FIG. 5, 13 pieces of fluorescent lamps 37 are shown. Only the fluorescent lamp arranged at the center of the screen is supported on the 1-piece-use intermediate holder 50, and other fluorescent lamps are supported on the 2-piece-use intermediate holders 40. The fluorescent lamps 37 in this embodiment are external electrode fluorescent lamps and hence, a power source cable is not provided for electric connection with every fluorescent lamp. That is, a common electrode 371 is connected to the external electrodes of the respective fluorescent lamps 37, and the power source from the inverter is supplied to the respective fluorescent lamps 37 via one cable 372.

Figure 6:
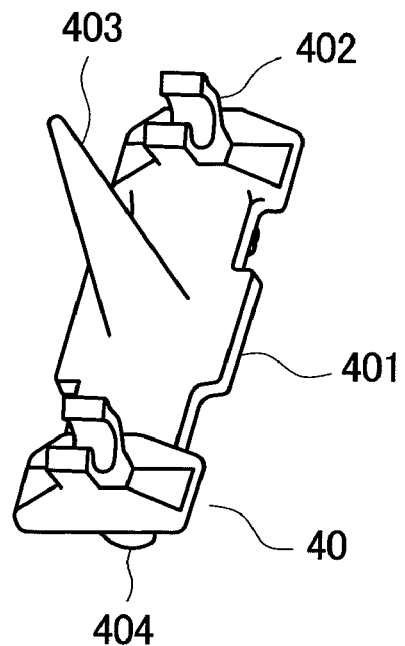
FIG. 6 is a perspective view of an intermediate holder as viewed from above.
Figure 7:
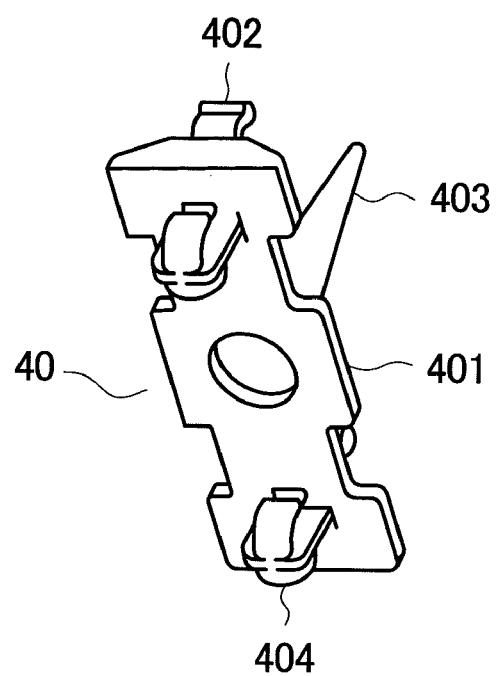
FIG. 7 is a perspective view of the intermediate holder as viewed from below.

FIG. 6 is a perspective view of the intermediate holder 40 as viewed from a front side. FIG. 6 shows an example of the intermediate holder 40 for supporting 2 pieces of fluorescent lamps 37. The intermediate holder 40 is constituted of a base portion 401, fluorescent lamp holding portions 402, and a spacer portion 403. The fluorescent lamps 37 are set and held in the fluorescent lamp holding portions 402. As described later, the spacer portion 403 holds the distance between the fluorescent lamps 37 and the diffusion plate 35. FIG. 7 is a perspective view of the intermediate holder 40 as view from a back side. Mounting portions 404 are provided for mounting the intermediate holder 40 on the lower frame 39. The intermediate holder 40 is made of polycarbonate. FIG. 6 and FIG. 7 show an example of the intermediate holder which supports 2 pieces of fluorescent lamps 37. The 1-piece-use intermediate holder and the holder for supporting three or more fluorescent lamps 37 have the substantially same basic constitution and role. No spacer portion is formed on the 1-piece-use intermediate holder.

Figure 8:
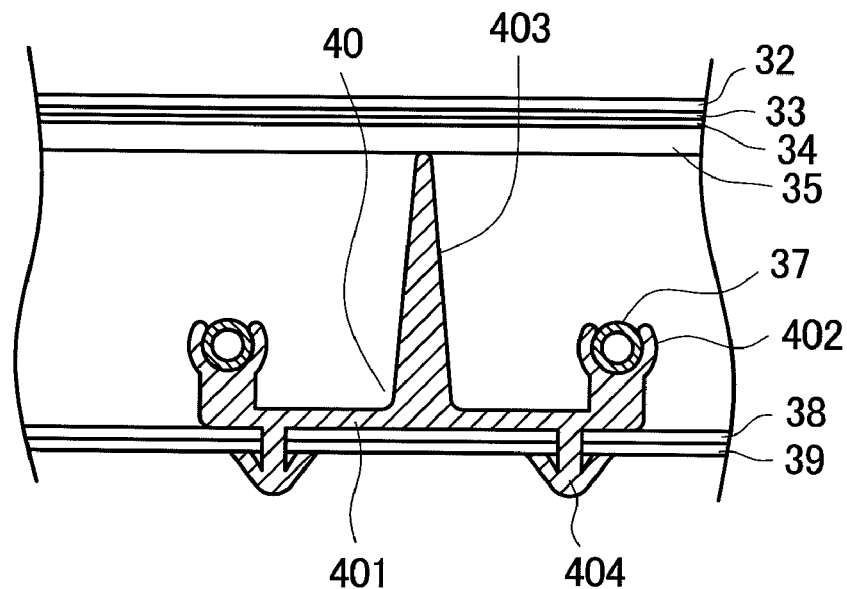
FIG. 8 is a cross-sectional view showing a state that the intermediate holder is mounted on the lower frame.

FIG. 8 shows a state that the intermediate holder 40 is mounted on the lower frame 39 and holds the fluorescent lamps 37. The intermediate holder 40 is mounted on the lower frame 39 by holding portions 404. The fluorescent lamp holding portions 402 hold the fluorescent lamps 37. The spacer portion 403 holds the distance between the reflection sheet 38 mounted on the lower frame 39 and the diffusion plate 35 or the distance between the fluorescent lamps 37 and the diffusion plate 35 at a fixed value. The diffusion sheet 35 has a small thickness, that is, 1 mm. Accordingly, when a display screen becomes large, a deflection is generated in the diffusion plate 35 and hence, the distance between the diffusion plate 35 and the fluorescent lamps 37 is gradually decreased in the direction toward the center of the screen. Further, the deflection of the diffusion plate 35 varies and hence, the deflection of the diffusion plate 35 appears as brightness irregularities of the backlight 3. The spacer portion 403 of the intermediate holder 40 holds the distance between the diffusion plate 35 and the fluorescent lamps 37 at a fixed value thus playing a role of suppressing the brightness irregularities.

FIG. 5 shows the arrangement of the fluorescent lamps 37 which constitutes the technical features of this embodiment. In this embodiment, odd-number pieces of, that is, 13 pieces of external electrode fluorescent lamps 37 are used. Accordingly, it is possible to arrange the fluorescent lamp 37 directly below the center of the TV screen where the brightness is to be emphasized most or is considered most important. The conventional fluorescent lamps 37 of the backlight 3 have been formed of CCFL and have been used in pairs and hence, when the fluorescent lamps 37 are arranged in in-plane symmetry on the screen, the fluorescent lamp 37 cannot be arranged on the center of the screen. Due to such a constitution, conventionally, it is impossible to effectively ensure the brightness at the center of the TV screen where the brightness is to be emphasized most. In this embodiment, by making use of the external electrode fluorescent lamps and by setting the number of the fluorescent lamps 37 to an odd number, it is possible to arrange the fluorescent lamp 37 at the center of the screen. Accordingly, it is possible to effectively ensure the brightness at the center of the TV screen where the brightness is to be emphasized most.

Embodiment 2

Figure 9:
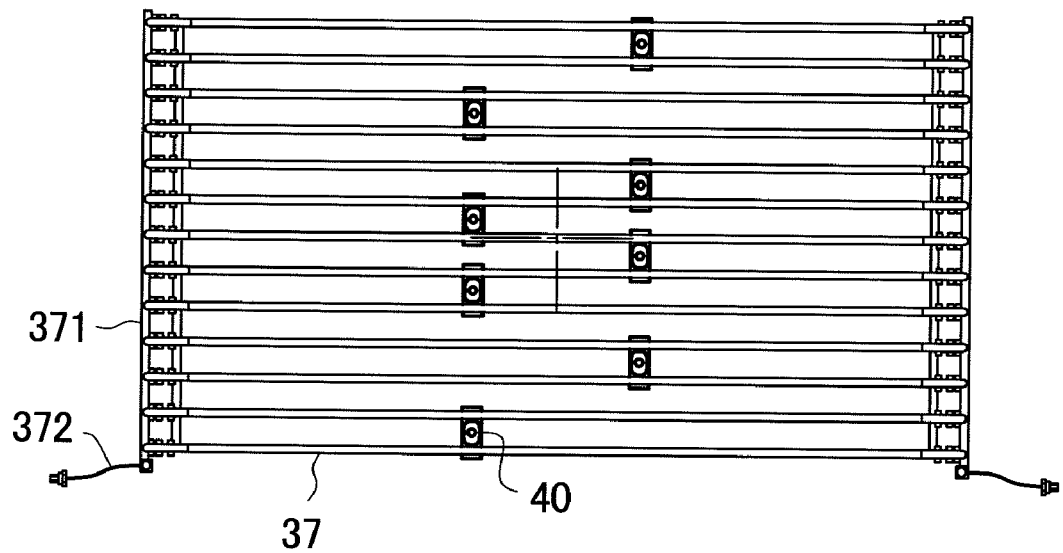
FIG. 9 is an arrangement view of fluorescent lamps of a liquid crystal display device of an embodiment 2.

FIG. 9 is an arrangement view of fluorescent lamps 37 showing a second embodiment of the present invention. The constitution of a liquid crystal display device of this embodiment is substantially equal to the constitution of the liquid crystal display device of the embodiment 1 except for the arrangement of the fluorescent lamps 37. Also in this embodiment, the fluorescent lamps 37 are formed of an external electrode fluorescent lamp. Accordingly, it is unnecessary to provide a power source cable from an inverter for every fluorescent lamp, and a power source is supplied to external electrodes of the respective fluorescent lamps 37 via a fluorescent-lamp-use common electrode.

Also in this embodiment, the odd-number pieces of, that is, 13 pieces of fluorescent lamps 37 are used. Accordingly, it is possible to arrange the fluorescent lamp 37 at a center portion of a TV screen. The technical feature of this embodiment lies in that all of intermediate holders for supporting 13 pieces of the fluorescent lamps 37 are respectively formed of an intermediate holder 40 which supports 2 pieces of fluorescent lamps 37. In the constitution of this embodiment, the fluorescent lamp 37 at the center portion of the screen and the fluorescent lamps 37 which are arranged on both sides of the fluorescent lamp 37 at the center portion of the screen are supported on 2 pieces of intermediate holders 40.

In this embodiment, only one kind of 2-piece-use intermediate holder 40 is used thus facilitating the assembling operation of the fluorescent lamps. Further, the use of one kind of intermediate holders as parts for supporting the fluorescent lamps is advantageous also in view of a part cost. Further, in this embodiment, a large number of intermediate holders 40 are arranged in the vicinity of the center of the screen and hence, the density of spacer portions of the intermediate holders is also high at the center portion of the screen. The spacer portions of the intermediate holders play a role of preventing a deflection of a diffusion plate 35. In this embodiment, the deflection of the diffusion plate 35 becomes large at the center portion of the screen and hence, the dense arrangement of the spacer portions of the intermediate holders at the center portion of the screen is reasonable from a viewpoint of setting a distance between the diffusion plate 35 and the fluorescent lamps 37 to a fixed value.

Embodiment 3

Figure 10:
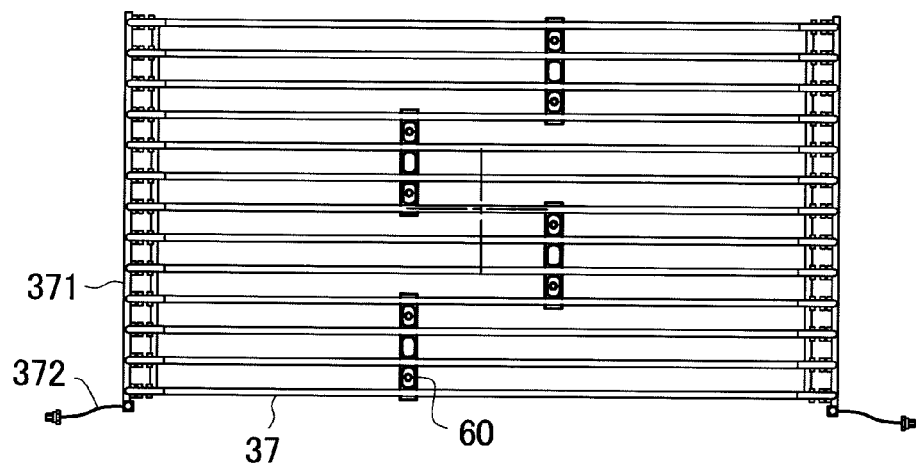
FIG. 10 is an arrangement view of fluorescent lamps of a liquid crystal display device of an embodiment 3.

FIG. 10 is an arrangement view of fluorescent lamps 37 showing a third embodiment of the present invention. The constitution of a liquid crystal display device of this embodiment is substantially equal to the constitution of the liquid crystal display device of the embodiment 1 except for the arrangement of the fluorescent lamps 37. Also in this embodiment, the fluorescent lamps 37 are formed of an external electrode fluorescent lamp. Accordingly, it is unnecessary to provide a power source cable from an inverter for every fluorescent lamp, and a power source is supplied to external electrodes of the respective fluorescent lamps 37 via a fluorescent-lamp-use common electrode.

Also in this embodiment, the odd-number pieces of, that is, 13 pieces of fluorescent lamps 37 are used. Accordingly, it is possible to arrange the fluorescent lamp 37 at a center portion of a TV screen. The technical feature of this embodiment lies in that the intermediate holders for supporting 13 pieces of the fluorescent lamps 37 are formed of a 4-piece-use intermediate holder 60 which supports 4 pieces of fluorescent lamps 37. In the constitution of this embodiment, the fluorescent lamp 37 at the center portion of the screen and the fluorescent lamps 37 arranged on both sides of the fluorescent lamp 37 at the center portion of the screen are supported on 2 pieces of intermediate holders 60.

In this embodiment, only 4 pieces of intermediate holders 60 each of which supports four pieces of fluorescent lamps 37 are used thus facilitating the assembling operation of the fluorescent lamps. Further, the use of one kind of intermediate holders as parts for supporting the fluorescent lamps is advantageous also in view of a part cost. The 4-piece-use intermediate holders 60 of this embodiment respectively include two spacer portions. Accordingly, even when the number of the intermediate holders is small, the 4-piece-use intermediate holders 60 can play a role of holding the distance between the diffusion plate 35 and the fluorescent lamps 37 in the same manner as the 2-piece-use intermediate holders.

Embodiment 4

Figure 11:
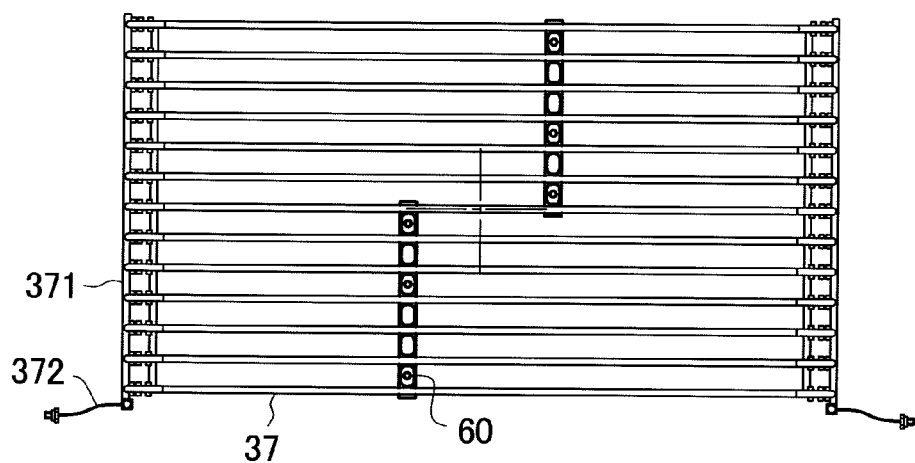
FIG. 11 is an arrangement view of fluorescent lamps of a liquid crystal display device of an embodiment 4.

FIG. 11 is an arrangement view of fluorescent lamps 37 showing a fourth embodiment of the present invention. The constitution of a liquid crystal display device of this embodiment is substantially equal to the constitution of the liquid crystal display device of the embodiment 1 except for the arrangement of the fluorescent lamps 37. Also in this embodiment, the fluorescent lamps 37 are formed of an external electrode fluorescent lamp. Accordingly, it is unnecessary to provide a power source cable from an inverter for every fluorescent lamp, and a power source is supplied to external electrodes of the respective fluorescent lamps 37 via a fluorescent-lamp-use common electrode.

Also in this embodiment, the odd-number pieces of, that is, 13 pieces of fluorescent lamps 37 are used. Accordingly, it is possible to arrange the fluorescent lamp 37 at a center portion of a TV screen. The technical feature of this embodiment lies in that the intermediate holders for supporting 13 pieces of the fluorescent lamps 37 are formed of a 7-piece-use intermediate holder 70 which supports 7 pieces of fluorescent lamps 37. In the constitution of this embodiment, the fluorescent lamp 37 at the center portion and the fluorescent lamps 37 arranged on both sides of the fluorescent lamp 37 at the center portion of the screen are supported on 2 pieces of intermediate holders 70.

In this embodiment, only 2 pieces of the 7-piece-use intermediate holders 70 for supporting the fluorescent lamps 37 are used thus further facilitating the assembling operation of the fluorescent lamps compared to the embodiment 3. Further, the use of one kind of intermediate holders as parts for supporting the fluorescent lamps is advantageous also in view of a part cost. The 7-piece-use intermediate holders 70 of this embodiment respectively include 3 pieces of spacer portions. Accordingly, even when the number of the intermediate holders 70 is two, the 7-piece-use intermediate holders 70 can play a role of holding the distance between the diffusion plate 35 and the fluorescent lamps 37 in the same manner as the 2-piece-use intermediate holders. The number and the position of the spacer portions may be determined corresponding to the deflection condition of the diffusion plate 35. In this case, it is advantageous in terms of cost to arrange the spacer portions of the 7-piece-use intermediate holders 70 at positions where the use of one kind of 7-piece-use intermediate holder 70 is sufficient.

Embodiment 5

Figure 12:
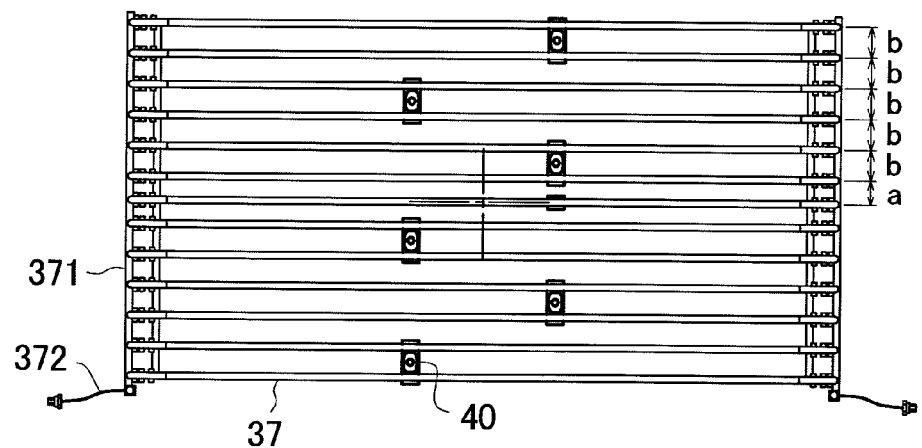
FIG. 12 is an arrangement view of fluorescent lamps of a liquid crystal display device of an embodiment 5.

FIG. 12 is an arrangement view of fluorescent lamps 37 showing a fifth embodiment of the present invention. The constitution of a liquid crystal display device of this embodiment is substantially equal to the constitution of the liquid crystal display device of the embodiment 1 except for the arrangement of the fluorescent lamps 37. Also in this embodiment, the fluorescent lamps 37 are formed of an external electrode fluorescent lamp. Accordingly, it is unnecessary to provide a power source cable from an inverter for every fluorescent lamp, and a power source is supplied to external electrodes of the respective fluorescent lamps 37 via a fluorescent-lamp-use common electrode.

Also in this embodiment, the odd-number pieces of, that is, 13 pieces of fluorescent lamps 37 are used. Accordingly, it is possible to arrange the fluorescent lamp 37 at a center portion of a TV screen. The technical feature of this embodiment lies in that intervals between the fluorescent lamp 37 at the center and the fluorescent lamps 37 arranged on both sides of the fluorescent lamp 37 at the center are set smaller than intervals between other fluorescent lamps 37. Due to such a constitution, it is possible to further enhance the brightness at the center portion of the screen. That is, power consumption of the backlight 3 can be reduced corresponding to the increase of the brightness.

The intermediate holder used in this embodiment is substantially equal to the intermediate holder used in the embodiment 1. That is, this embodiment uses the 6 pieces of 2-piece-use intermediate holders 40 and 1 piece of 1-piece-use intermediate holder. All of 2-piece-use intermediate holders 40 have the same size. That is, in this embodiment, only the intervals between the fluorescent lamp 37 at the center portion and the fluorescent lamps 37 on both sides of the fluorescent lamp 37 at the center portion are made different from the intervals of other fluorescent lamps 37 and hence, all of the intermediate holders can have the same size. Further, this embodiment has an advantageous effect that the brightness at the center of the TV screen can be controlled by merely adjusting the intervals between the fluorescent lamp 37 at the center portion and the fluorescent lamps 37 on both sides of the fluorescent lamp 37 at the center portion.

Embodiment 6

Figure 13:
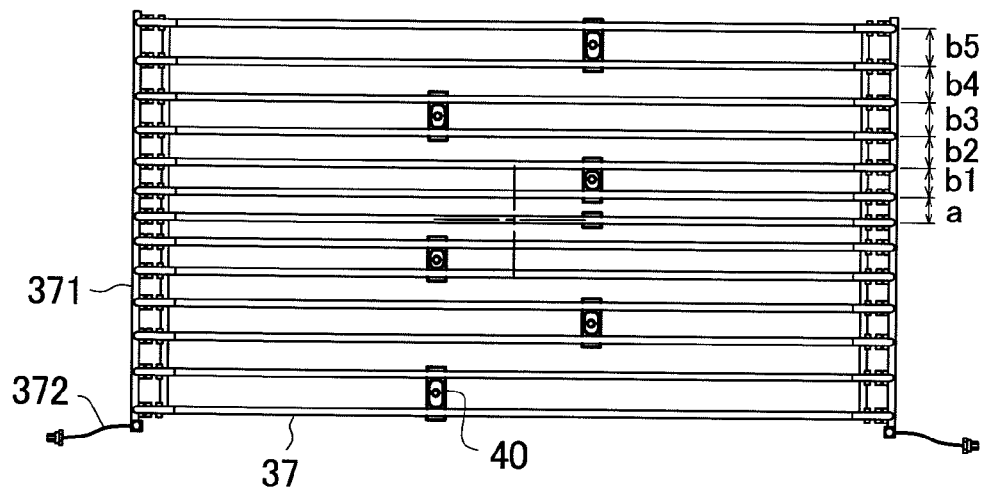
FIG. 13 is an arrangement view of fluorescent lamps of a liquid crystal display device of an embodiment 6.

FIG. 13 is an arrangement view of fluorescent lamps 37 showing a sixth embodiment of the present invention. The constitution of a liquid crystal display device of this embodiment is substantially equal to the constitution of the liquid crystal display device of the embodiment 1 except for the arrangement of the fluorescent lamps 37. Also in this embodiment, the fluorescent lamps 37 are formed of an external electrode fluorescent lamp. Accordingly, it is unnecessary to provide a power source cable from an inverter for every fluorescent lamp, and a power source is supplied to external electrodes of the respective fluorescent lamps 37 via a fluorescent-lamp-use common electrode.

Also in this embodiment, the odd-number pieces of, that is, 13 pieces of fluorescent lamps 37 are used. Accordingly, the fluorescent lamp 37 can be arranged at a center portion of a TV screen. The technical feature of this embodiment lies in that the intervals of the fluorescent lamps 37 take the minimum value at a center portion of the screen, and the intervals of the fluorescent lamps 37 are increased in the direction toward peripheries of the screen. Due to such a constitution, it is possible to increase the brightness at the center of the TV screen and, at the same time, to smoothly and gradually reduce the brightness in the direction toward the peripheries of the screen.

This embodiment uses, in the same manner as the embodiment 1, 6 pieces of intermediate holders 40 each of which supports two fluorescent lamps and 1 piece of intermediate holder 50 which supports one fluorescent lamp. However, the 2-piece-use intermediate holders 40 used in this embodiment differ from each other with respect to the interval of the fluorescent lamps 37 within 1 piece of holder. Accordingly, it is necessary to prepare 2 or more kinds of intermediate holders 40.

This is because that the 2-piece-use intermediate holders 40 are used as the intermediate holders in this case. Accordingly, when 4-piece-use or 7-piece-use intermediate holders are used, it is possible to use the same part by preliminarily changing the intervals of portions of the intermediate holders for supporting the fluorescent lamps 37.

Embodiment 7

Figure 14:
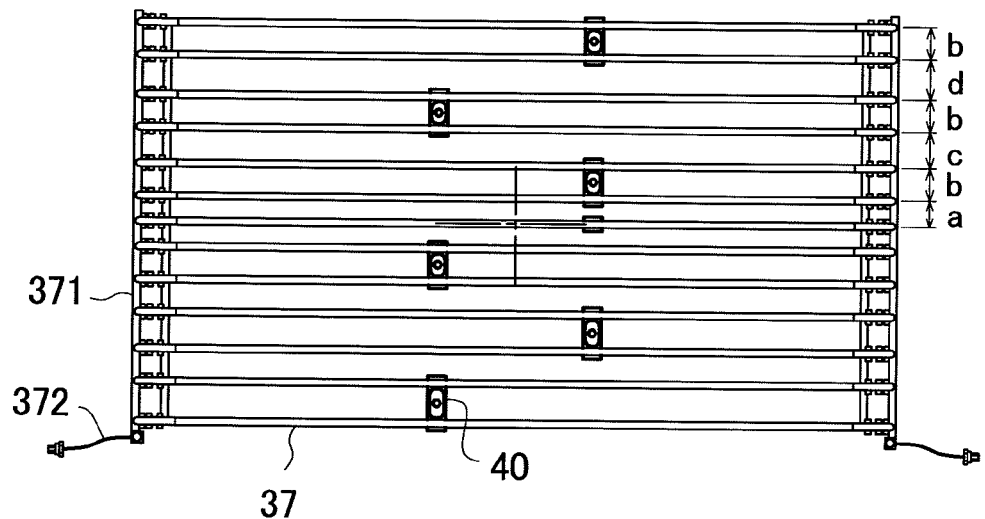
FIG. 14 is an arrangement view of fluorescent lamps of a liquid crystal display device of an embodiment 7.
Figure 15:
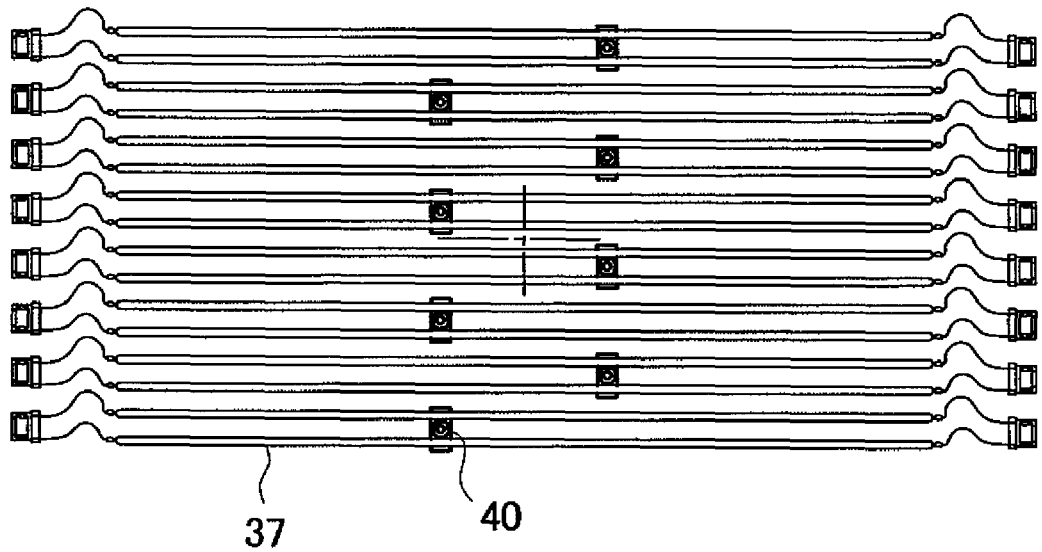
FIG. 15 is an arrangement view of fluorescent lamps of a conventional liquid crystal display device.
Figure 16:
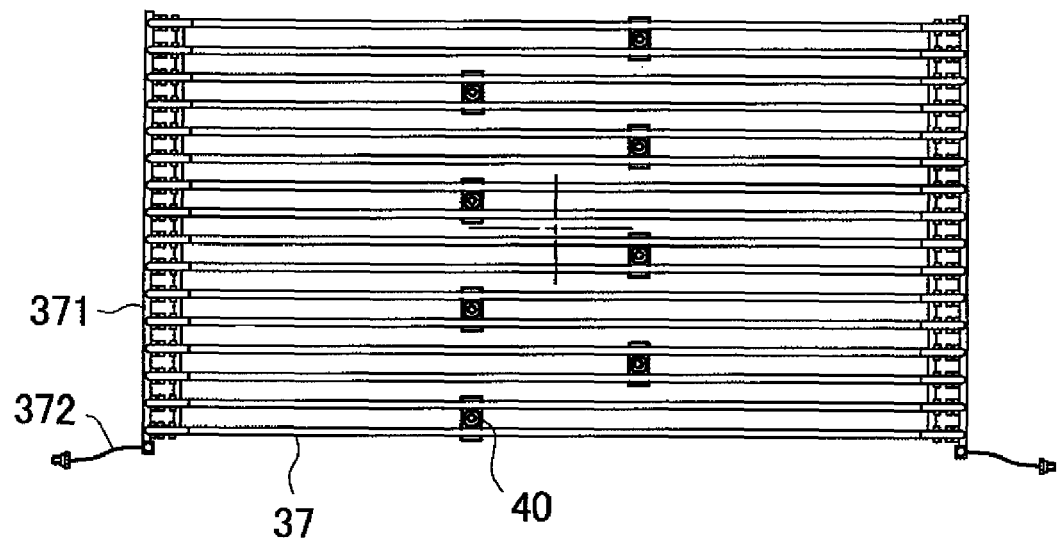
FIG. 16 is an arrangement view of fluorescent lamps of another conventional liquid crystal display device.

FIG. 14 shows an example which uses 2-piece-use intermediate holders 40, wherein intervals of fluorescent lamps 37 are set to a minimum value at a center portion of a TV screen, and the intervals of the fluorescent lamps 37 are gradually increased in the direction toward peripheries of the TV screen. The constitution of a liquid crystal display device of this embodiment is substantially equal to the liquid crystal display device of the embodiment 1 except for the constitution shown in FIG. 14. In this embodiment, different from the embodiment 6, one kind of intermediate holders 40 for supporting 2 pieces of fluorescent lamps is provided. That is, as shown in FIG. 14, the intervals of the fluorescent lamps 37 within the intermediate holder for supporting 2 pieces of fluorescent lamps 37 are set to a fixed value "b".

In this embodiment, the intervals between the fluorescent lamp 37 at the center of the screen and the fluorescent lamps 37 arranged on both sides of the fluorescent lamp 37 at the center of the screen are set to a minimum value a. The intervals of the fluorescent lamps 37 which are determined by the intermediate holders 40 are fixed to a value "b". The intervals between the fluorescent lamps 37 determined based on the distance between intermediate holders 40 are increased in the direction toward the peripheries of the screen from the center of the screen. That is, in FIG. 14, the relationship of c<d is established. According to this embodiment, even when the intermediate holders 40 each of which supports two fluorescent lamps 37 are formed of a single kind of holder, the intervals of the fluorescent lamps 37 can be increased in the direction toward the peripheries of the screen from the center of the screen and hence, the brightness at the center of the screen can be effectively increased and, at the same time, the brightness can be smoothly reduced in the direction toward the peripheries of the screen without pushing up a cost of the intermediate holders 40.

Although the explanation has been made with respect to the case which uses 13 pieces of fluorescent lamps 37 in total in the above-mentioned embodiment, it is needless to say that the present invention is not limited to such a case, and the substantially same advantageous effects can be obtained even when the number of fluorescent lamps 37 is set to the odd-number pieces smaller than 13 pieces (excluding 1 piece) or the odd-number pieces larger than 13 pieces.

What is claimed is:

1. A liquid crystal display device comprising:
a liquid crystal display panel; and
a direct backlight including a plurality of fluorescent lamps
wherein the fluorescent lamps are external electrode fluorescent lamps, the number of fluorescent lamps is an odd-number, a center one of the fluorescent lamps positioned at a center of the plurality of fluorescent lamps is aligned with a center of a screen of the liquid crystal display panel, and each of the plurality of fluorescent lamps is supported by at least one of a plurality of intermediate holders disposed at a position between and substantially away from the external electrodes of the fluorescent lamps;
wherein the center one of the plurality of fluorescent lamps is supported by two of the intermediate holders and at least another one of the plurality of fluorescent lamps is supported by only one of the intermediate holders; and
wherein each of the intermediate holders has a same shape and supports at least four of the plurality of fluorescent lamps.

2. A liquid crystal display device according to claim 1, wherein each of the intermediate holders supports a respective one of the fluorescent lamps at the position of the fluorescent lamp which is closer to a center of the length of the fluorescent lamp than to the external electrodes thereof.

3. A liquid crystal display device according to claim 1, wherein at least a further one of the fluorescent lamps is supported by two of the intermediate holders.

4. A liquid crystal display device according to claim 1, wherein only the center one of the fluorescent lamps is supported by the two of the intermediate holders.

5. A television-receiver-set-use liquid crystal display device comprising:
a liquid crystal display panel; and
a direct backlight including a plurality of fluorescent lamps, a light guide plate, a diffusion sheet and a reflection sheet arranged below the plurality of fluorescent lamps, wherein
the fluorescent lamps are external electrode fluorescent lamps, the number of the fluorescent lamps is an odd-number, a center one of the fluorescent lamps positioned at a center of the plurality of fluorescent lamps is aligned with a center of a screen of the liquid crystal display panel, and each of the fluorescent lamps is supported by at least one of a plurality of intermediate holders disposed at a position between and substantially away from the external electrodes of the fluorescent lamps;
wherein the center one of the plurality of fluorescent lamps is supported by two of the intermediate holders and at least another one of the plurality of fluorescent lamps is supported by only one of the intermediate holders; and
wherein each of the intermediate holders supports at least four of the plurality of fluorescent lamps.

6. A liquid crystal display device according to claim 5, wherein each of the intermediate holders supports a respective one of the fluorescent lamps at the position of the fluorescent lamp which is closer to a center of the length of the fluorescent lamp than to the external electrodes thereof.

7. A liquid crystal display device according to claim 5, wherein at least a further one of the fluorescent lamps is supported by two of the intermediate holders.

8. A liquid crystal display device according to claim 5, wherein only the center one of the fluorescent lamps is supported by the two of the intermediate holders.

* * * * *